(12) United States Patent
Conte

(10) Patent No.: US 6,851,218 B1
(45) Date of Patent: Feb. 8, 2005

(54) INSECT SWATTER

(76) Inventor: Francis Luca Conte, 6 Puritan Ave., Swampscott, MA (US) 01907

( * ) Notice: Subject to any disclaimer, the term of this patent is extended or adjusted under 35 U.S.C. 154(b) by 1826 days.

(21) Appl. No.: 08/331,851

(22) Filed: Oct. 31, 1994

(51) Int. Cl.[7] .................................................. A01M 3/02
(52) U.S. Cl. .............................. 43/137; 124/18; 43/135
(58) Field of Search ..................... 43/135, 137; 124/17, 124/18, 35.1

(56) References Cited

U.S. PATENT DOCUMENTS

| | | | | | |
|---|---|---|---|---|---|
| 883,915 A | * | 4/1908 | Slean | .......................... | 43/135 |
| 1,009,531 A | * | 11/1911 | Kopp | .......................... | 43/135 |
| 1,059,736 A | * | 4/1913 | Kilduff | .......................... | 43/135 |
| 1,084,008 A | * | 1/1914 | Hamaker | .................... | 43/135 |
| 1,597,140 A | * | 8/1926 | Barto | .......................... | 43/135 |
| 2,054,719 A | * | 9/1936 | Caron | .......................... | 124/18 |
| 2,505,591 A | * | 4/1950 | Stone | .......................... | 124/35.1 |
| 2,642,057 A | * | 6/1953 | Watkins | ....................... | 124/18 |
| 3,704,981 A | * | 12/1972 | Pohr | ........................... | 43/135 |
| 4,774,786 A | * | 10/1988 | Zaremba | ..................... | 43/135 |
| 4,860,718 A | * | 8/1989 | Howell | ........................ | 124/18 |

OTHER PUBLICATIONS

Advertisement, (Author Unknown), "# T318 Farm–House Fly Swatter," 1st Qtr. 1994, single page.

* cited by examiner

*Primary Examiner*—Kurt Rowan

(57) ABSTRACT

An insect swatter includes an elongate rod with an elastic lash fixedly joined to a distal end thereof. The lash is sized for being stretched from the rod distal end to adjacent a proximal end of the rod so that release of the lash results in spontaneous contraction thereof for swatting the insect. In an exemplary embodiment, the swatter is in the form of a pistol, with the lash extending from the distal end of the rod to a latch operated by a trigger. Aiming the rod toward the insect and pulling the trigger releases the lash for swatting the insect.

12 Claims, 2 Drawing Sheets

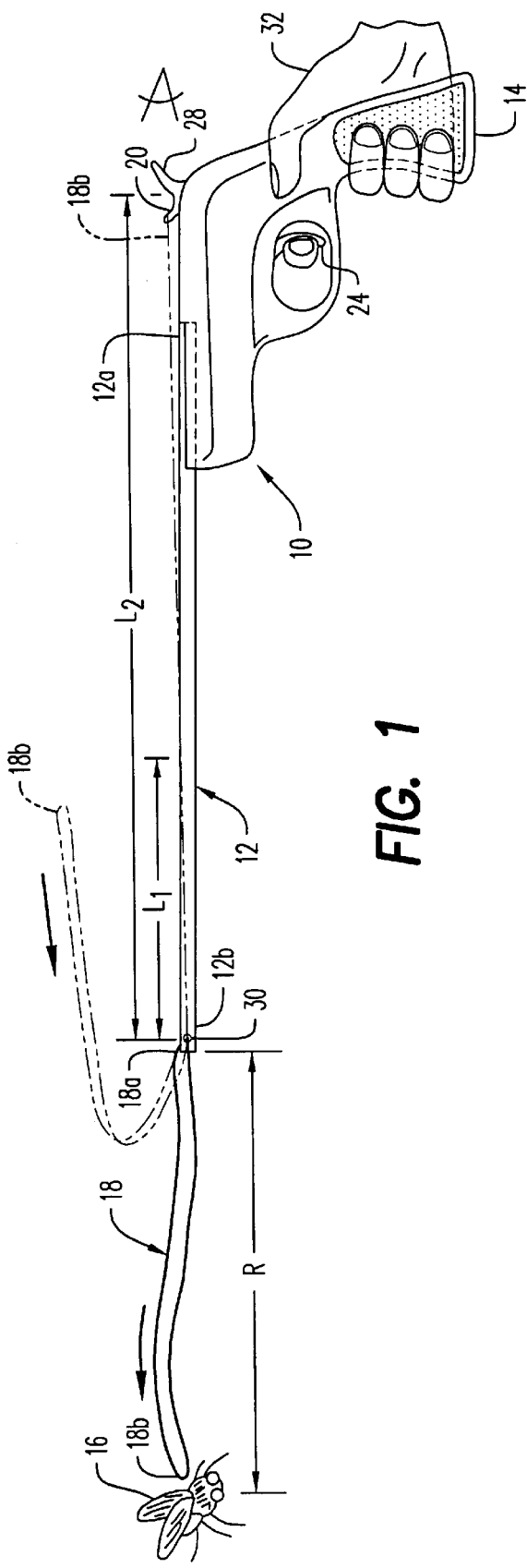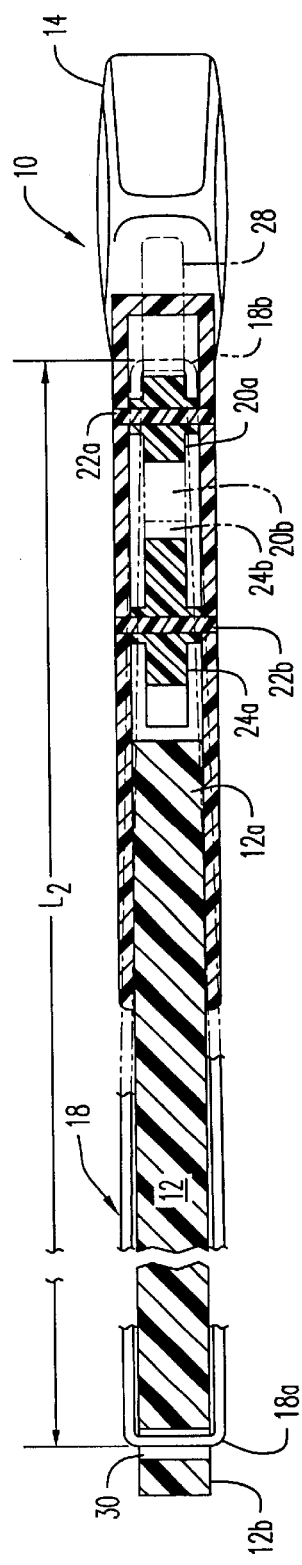
FIG. 1
FIG. 4

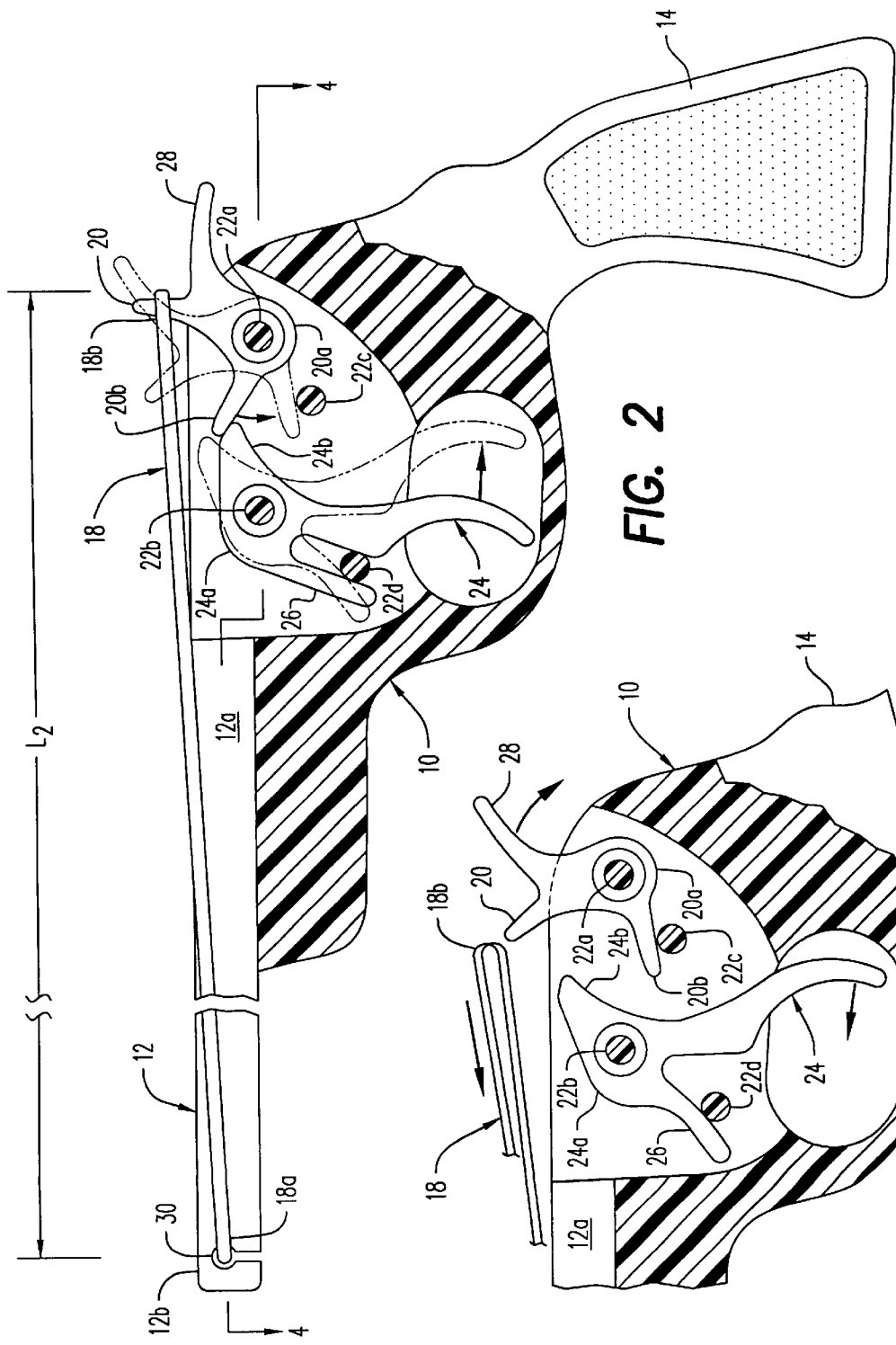

INSECT SWATTER

The present invention relates generally to insect exterminators, and, more specifically, to an insect swatter.

BACKGROUND OF THE INVENTION

A typical insect swatter, commonly referred to as a fly swatter, has a long handle with a proximal end configured for being gripped by a person, and a distal end at which is secured a generally rectangular, perforated wire or plastic mesh. In operation, the swatter is manually moved through the air for striking the insect with the mesh. However, the swatter must be moved very quickly in order to swat fast-reacting flies for example, or the fly will escape. The relatively large swatter mesh is apparently detectable by the insect either through its vision or by sensing the air being displaced as the mesh is moved.

If the swatter is moved quickly enough, the insect can be stricken which typically results in an offensive stain being created upon squashing of the insect.

Accordingly, an improved inset swatter is desirable which reduces the skill required for its effective use, and reduces resulting stains from the successful swatting of the insect.

SUMMARY OF THE INVENTION

An insect swatter includes an elongate rod with an elastic lash fixedly joined to a distal end thereof. The lash is sized for being stretched from the rod distal end to adjacent a proximal end of the rod so that release of the lash results in spontaneous contraction thereof for swatting the insect. In an exemplary embodiment, the swatter is in the form of a pistol, with the lash extending from the distal end of the rod to a latch operated by a trigger. Aiming the rod toward the insect and pulling the trigger releases the lash for swatting the insect.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which:

FIG. 1 is an elevational view of a hand-held insect swatter in accordance with one embodiment of the present invention.

FIG. 2 is an elevational, partly sectional enlarged view of the insect swatter illustrated in FIG. 1 showing a trigger and cooperating latch in cocked positions.

FIG. 3 is an enlarged, partly sectional view of the insect swatter illustrated in FIG. 2 showing a trigger and cooperating latch in fired positions.

FIG. 4 is a top, partly sectional view of the insect swatter illustrated in FIG. 2 and taken generally along line 4—4.

DESCRIPTION OF THE PREFERRED EMBODIMENT(S)

Illustrated in FIG. 1 is an exemplary embodiment of an insect swatter 10 in the exemplary form of a pistol, although in other embodiments it may be in the form of a rifle or other suitable configurations. The swatter 10 includes an elongate rod 12 which may be solid as illustrated, or hollow if desired, and may have any suitable cross section such as circular for example. The rod 12 has a proximal end 12a for being hand-held, and in the exemplary embodiment illustrated in FIG. 1 a gun-type handgrip 14, in the exemplary form of a pistol handgrip, is suitably fixedly joined to the rod proximal end 12a. In alternate embodiments, the handgrip 14 could be a rifle handgrip with a cooperating shoulder stock for example. The handgrip 14 provides a convenient manner for hand holding the elongate rod 12 and aiming it toward an insect 16, such as a fly for example. The rod 12 has a distal end 12b, opposite to the proximal end 12a, which is aimed during operation at or toward the insect 16. An elastic lash 18 in the exemplary form of a conventional annular rubber band has a proximal end 18a fixedly joined to the rod distal end 12b which retains the lash 18 to the rod 12. The lash 18 has an opposite, distal end 18b which is used for swatting or killing the insect 16.

As shown in FIG. 1, the lash 18 is preferably so sized or so dimensioned for being stretched from the rod distal end 12b to adjacent the rod proximal end 12a so that release of the lash distal end 18b spontaneously contracts or "fires" the lash 18 for swatting or whipping the lash distal end 18b against the insect 16.

An exemplary method of using the swatter 10 includes manually stretching the lash 18 by pulling the distal end 18b thereof generally parallel to the rod 12 and adjacent to the rod proximal end 12a which stores energy in the lash 18. This is shown in phantom line in FIG. 1 and in solid line in FIG. 2. By aiming the rod distal end 12b at the insect 16 and within reach or striking range R of the whipping lash 18, and then releasing the lash distal end 18b, the lash 18 spontaneously contracts for swatting the lash distal end 18b against the insect 16, with the kinetic energy released by the lash 18 being sufficient for killing or severely maiming the insect 16.

In its simplest form, the rod 12 and the attached lash 18 form a whip, with the rod 12 being used for manually aiming the swatter 10 at the insect 16 so that the energy stored in the stretched lash 18 causes the lash 18 to accelerate from the rod proximal end 12a, generally parallel along the rod 12 toward the rod distal end 12b, and continue to travel in the same direction away from the rod distal end 12b for impacting the insect 16. The whipping action of the lash 18 is shown in three positions in FIG. 1 and will carry the lash 18 along the line-of-sight formed by the rod 12 aimed at the insect 16 for allowing easy and accurate swatting thereof. As long as the rod distal end 12b is positioned within the whipping range R of the lash 18, the insect 16 may be effectively swatted.

The lash 18, like a whip cord, is completely flexible, (not rigid), but unlike a whip cord, it is also elastically stretchable. It may have any suitable cord-like configuration, such as the rubber band disclosed in the preferred embodiment. In this way, energy may be conveniently stored in the stretched lash 18 by stretching it in one direction, and then the energy is released which carries the lash 18 along the line-of-sight in the direction opposite to the stretching direction thereof to accurately hit the insect 16. The striking energy includes the energy stored in the stretched lash 18, as well as any additional energy due to the whipping effect. The lash 18 is therefore not an expendable, one-shot projectile, but remains with the rod 12 for repeated use.

Since the lash 18 itself stores the energy used for moving the lash 18, it is relatively easy to use and does not require the fast hand action required of a typical fly swatter. Whipping of the lash 18 is spontaneous and occurs within a fraction of a second for quickly swatting the insect 16 well before its ability to react thereto. Furthermore, the lash 18 is relatively small as compared to conventional fly swatters, and is less visible by the insect 16 compared thereto, and moves less air than a conventional fly swatter which reduces the ability for the insect 16 to sense the striking action of the lash 18.

Yet further, the energy imparted by the whipping lash 18 against the insect 16 is confined to a very small point which in most cases immediately kills the insect 16 with little or no stain therefrom due to the striking thereof.

In its simplest form, the lash 18 may be manually stretched and held at its distal end 18b adjacent to the rod proximal end 12a and then manually released for swatting the insect 16. However, in order to add additional convenience and accuracy in using the swatter 10, it preferably further includes a latch or hook 20 as shown in more particularity in FIG. 2. The latch 20 may simply be in the form of a straight, smooth bar having an enlarged proximal end 20a through which extends a latch pin 22a for pivotally joining the latch 20 to the handgrip 14 adjacent to the rod proximal end 12a for releasably latching the lash distal end 18b thereto. The latch 20 is joined to the top of the handgrip 14 in a suitable cavity therein.

The latch 20 is shown in FIG. 2 in a first or cocked position wherein the latch 20 extends generally perpendicularly upwardly from the rod 12, or from its longitudinal centerline axis, for retaining or latching the lash distal end 18b thereto. The latch 20 in its cocked position is preferably inclined slightly rearwardly away from the rod 12 to ensure that the lash distal end 18b does not inadvertently slip therefrom prior to firing.

Means including a trigger 24 are operatively joined to the latch 20 for selectively releasing the latch 20 from its cocked position upon pulling the trigger 24 rearwardly to release the lash distal end 18b for swatting the insect 16 therewith. Shown also in FIG. 2 is the trigger 24 having an enlarged proximal end 24a which is pivotally joined to the handgrip 14 by a trigger pin 22b extending therethrough so that the trigger 24 may be pivoted between the first or cocked position thereof holding the latch 20 in its cocked position, and a second or fired position illustrated in FIG. 3 releasing the latch 20 for being pivoted to its fired position also shown in FIG. 3.

In its fired position, the latch 20 is inclined forwardly toward the rod distal end 12b for allowing the lash distal end 18b to slip or slide off the latch 20 as shown in FIG. 3 for spontaneously contracting the lash 18 toward the rod distal end 12b. The trigger 24 is operatively joined to the latch 20 by any suitable means for releasing the latch 20 to pivot from its cocked position to its fired position upon pulling of the trigger 24. In an exemplary embodiment, the latch 20 includes an elongate latch cam 20b which extends generally radially outwardly from the latch proximal end 20a and the latch pin 22a toward the trigger proximal end 24a. And, the trigger 24 includes a complementary, elongate trigger cam 24b extending generally radially outwardly from the trigger proximal end 24a and trigger pin 22b therethrough, with the two cams 20b, 24b being engaged in the cocked positions for preventing rotation of the latch 20 as shown in FIG. 2. When the trigger 24 is pulled rearwardly as shown in FIG. 3, the trigger cam 24b slides past the latch cam 20 which allows the stretched lash 18 to pull the latch 20 into its fired position by rotating it counterclockwise, which in turn then allows the lash distal end 18b to slip from the latch 20 and be released therefrom. A suitable latch stop pin 22c is joined to the handgrip 14 adjacent to the latch pin 22a for limiting the counterclockwise rotation of the latch 20 by abutting the latch cam 20b as shown in FIG. 3.

As shown in FIGS. 2 and 3, a trigger return spring 26 in the exemplary form of a flexible cantilever is operatively joined between the trigger 24 and the handgrip 14, with the spring 26 being positioned for providing a returning force on the trigger 24 to return the trigger 24 to its cocked position upon finger release thereof. In the exemplary embodiment illustrated in FIGS. 2 and 3, the spring 26 extends integrally from the trigger proximal end 24a and generally parallel to the upper portion of the trigger 24 itself, and defines a space therebetween in which is disposed a stationary trigger stop pin 22d which is fixedly joined to the handgrip 14. In FIG. 2, the trigger 24 is in its cocked position with the return spring 26 being disposed on one side of the trigger stop pin 22d in an undeflected position for holding the trigger 24 in its forwardmost position abutting the opposite side of the trigger stop pin 22d. Upon pulling the trigger 24 rearwardly, which is shown in phantom line in FIG. 2 and in solid line in FIG. 3, the spring 26 elastically flexes against the trigger stop pin 22d as the trigger 24 is pulled rearwardly which allows the cooperating latch and trigger cams 20b, 24b to disengage so that the elastic lash 18 may pivot the latch 20 counterclockwise and be released therefrom. When the trigger 24 is released, the return force provided by the spring 26 causes the trigger 24 to rotate clockwise until the trigger 24 abuts the stop pin 22d.

Other conventional types of return springs may be used such as tension or compression springs disposed on suitable sides of the trigger 24 to provide the same returning force if desired.

In the exemplary embodiment illustrated in FIGS. 2 and 3, the latch 20 preferably also includes a conventional thumbgrip 28 integrally joined thereto and extending rearwardly, generally perpendicularly therefrom for manually returning or cocking the latch 20 to its cocked position. After the lash 18 is fired, the latch 20 rotates counterclockwise until the latch stop pin 22c prevents further rotation thereof. With, or without releasing the trigger 24, the thumbgrip 28 may be pressed downwardly for rotating the latch 20 clockwise to return it to its cocked position. If the trigger 24 is in its released position, cocking of the thumbgrip 28 causes the latch cam 20b to temporarily displace the trigger 24 upon sliding against the underside of the trigger cam 24b. When both the latch 20 and the trigger 24 are returned to their cocked positions, the lash 18 may be reloaded or reaffixed to the latch 20 in preparation for the next shot thereof.

As indicated above, the lash 18 is in the exemplary form of a rubber band, with the lash proximal end 18a forming a first loop as shown in more particularity in FIG. 4, and the lash distal end 18b forming an opposite, second loop positionable around the latch 20 as shown in FIGS. 2–4 for being simply retained or latched thereby. As shown in FIG. 2, the rod distal end 12b preferably includes a keyhole slot 30 sized for receiving the lash proximal end loop 18a therethrough for retaining the lash 18 to the rod 12 without allowing unintended disconnection therefrom when the lash 18 is fired. The keyhole slot 30 includes an enlarged cylindrical portion extending laterally through the middle of the rod distal end 12b, and a rectangular portion which faces or is open downwardly. The rectangular portion is preferably narrower than the unstretched cross section of the lash 18 to prevent its passage therethrough, with the cylindrical portion being suitably larger than the undistorted cross section of the lash 18 for loosely fixedly joining the lash 18 to the rod 12. In order to replace a worn or broken lash 18, the worn lash 18 may be suitably removed from the keyhole slot 30, with the replacement lash 18 being initially manually stretched so that its cross section is narrower than the rectangular portion of the keyhole slot 30 for allowing it to be inserted through the rectangular portion and into the cylindrical portion of the keyhole slot 30 wherein it is retained after being unstretched.

As shown in FIG. 2, the latch 20 extends upwardly from the handgrip 14 or generally perpendicularly to the longitudinal centerline of the rod 12, and the keyhole slot 30 is open downwardly in the direction opposite to the upward extension of the latch 20. In this way, the lash 18 is inclined slightly upwardly from the keyhole slot 30 to the latch 20 when latched thereto which provides good retention of the lash 18 to the latch 20 in its cocked position while also providing good aiming capability along the longitudinal axis of the rod 12.

Accordingly, in order to use the swatter 10, the thumbgrip 28 is cocked to position the latch 20 in its cocked position, with the trigger 24 also being positioned in its cocked position as shown in FIG. 2 for example. Stretching of the lash 18 is manually accomplished by the operator or user of the swatter 10 by pulling the lash distal end 18b generally parallel to the rod 12 and adjacent to the rod proximal end 12a for latching the lash distal end loop 18b around the latch 20. As shown in FIG. 1, the handgrip 14 is gripped by the hand 32 of the operator or user to aim the swatter 10 along its rod 12 at the insect 16, with the rod distal end 12b being correspondingly aimed at the insect 16 with the fired lash 18 being within striking range R thereof. Upon pulling the trigger 24, the latch 20 is released and spontaneously contracts or fires for swatting the insect 16 with the lash distal end 18b. The lash 18 may be reloaded and refired as often as desired until the lash 18 wears out or breaks. In that case, the lash 18 is readily replaced.

As shown in FIG. 1, the lash 18 has an unstretched free length $L_1$. The rod 12 and cooperating latch 20 have or define a collective cocked length $L_2$ measured linearly between the keyhole slot 30 and the latch 20 in its cocked position. The cocked length $L_2$ is preferably selected for stretching the lash 18 to about its maximum stretched length without breaking thereof to maximize the potential energy therein. In a preferred embodiment, the cocked length $L_2$ is at least three times the lash unstretched length $L_1$ which not only provides substantial striking energy within the lash 18, but also provides a substantial amount of striking range R which is the distance between the insect 16 and the rod distal end 12b. Of course, the striking range R is at least as large as the lash unstretched length $L_1$, and in actuality it is larger than the unstretched length $L_1$ since the kinetic energy in the striking lash 18 causes the lash 18 to stretch in the opposite direction from the rod 12 toward the insect 16 at which it is aimed.

In an exemplary embodiment of the present invention, the lash 18 may be in the form of a common rubber band having an unstretched length $L_1$ of 17 cm with a 2 mm square cross section. The cocked or stretched length $L_2$ of the lash 18 is about 60 cm which provides a substantial striking range R for the swatter of about 38 cm, which is greater than twice the unstretched length $L_1$. The swatter 10 may be manufactured from any suitable material. In the exemplary embodiment illustrated in the Figures, all components of the swatter 10 may be formed of conventional molded plastic. Plastic is preferred for the trigger 24 since the integral return spring 26 may be formed of suitably thin plastic for providing an effective elastic return force for the trigger 24. In other embodiments, the rod 12 and handgrip 14 may be formed of wood or metal as desired. Although the swatter 10 is illustrated in the Figures as being in the form of a long barreled pistol, it may take any suitable form including that of a rifle or other analogous shooting implement so that the stretched lash 18 may be suitably aimed at the insect 16 within an effective striking range R thereof for ensuring undetected swatting thereof.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United states is the invention as defined and differentiated in the following claims:

What is claimed is:

1. An insect swatter comprising:
   an elongate rod having a proximal end for being handheld, and an opposite distal end for being aimed at an insect;
   an elastic lash in the form of an annular rubber band having a proximal end forming a first loop fixedly joined to said rod distal end, and also having an opposite distal end forming a second loop, said lash being sized for being elastically stretched from said rod distal end to adjacent said rod proximal end so that release of said lash distal end spontaneously contracts said lash for swatting said lash distal end against said insect;
   a latch pivotally joined adjacent to said rod proximal end for releasably latching said lash distal end so that said second loop is positioned around said latch for being retained thereby, said latch being pivotable between cocked and fired positions, and including a thumbgrip extending generally perpendicularly therefrom for manually returning said latch to said cocked position thereof; and
   means pivotally joined adjacent to said latch for selectively releasing said latch to release said lash distal end for swatting said insect therewith.

2. A method of using the swatter of claim 1 comprising:
   stretching said lash by pulling said distal end thereof generally parallel to said rod and adjacent to said rod proximal end;
   latching said lash distal end to said latch;
   aiming said rod distal end at said insect; and
   releasing said latch for spontaneously contracting said lash for swatting said insect with said distal end thereof.

3. A swatter according to claim 1 further comprising:
   a gun handgrip fixedly joined to said rod proximal end;
   said latch being pivotally joined to said handgrip; and
   wherein said latch releasing means includes a trigger operatively joined to said latch for releasing said latch upon pulling said trigger.

4. A method of using the swatter of claim 3 comprising:
   stretching said lash by pulling said distal end thereof generally parallel to said rod adjacent to said rod proximal end;
   latching said lash distal end to said latch;
   gripping said handgrip to aim said rod distal end at said insect; and
   pulling said trigger to release said latch to spontaneously contract said lash for swatting said insect.

5. A swatter according to claim 3 wherein:
   said rod distal end includes a keyhole slot; and
   said lash first loop is disposed through said keyhole for fixedly joining said lash to said rod.

6. A method of using the swatter of claim 5 comprising:

stretching said lash by pulling said lash second loop generally parallel to said rod and adjacent to said rod proximal end;

latching said lash second loop around said latch;

gripping said handgrip to aim said rod distal end at said insect; and pulling said trigger to release said latch to spontaneously contract said lash for swatting said insect.

7. A swatter according to claim 5 wherein:

said latch extends upwardly from said handgrip;

said keyhole slot is open downwardly in a direction opposite to said upward extension of said latch; and said lash is inclined upwardly from said keyhole slot to said latch when latched thereto.

8. A swatter according to claim 5 wherein:

said latch is pivotable between said cocked position wherein said latch extends generally perpendicularly to said rod for retaining said lash second loop thereon, and said fired position wherein said latch is inclined forwardly toward said rod distal end for allowing said lash second loop to slip off said latch for spontaneously contracting said lash; and said trigger is operatively joined to said latch for releasing said latch to pivot from said cocked position thereof to said fired position thereof upon pulling said trigger.

9. A swatter according to claim 8 further comprising:

a spring joined between said trigger and said handgrip;

said trigger being pivotable between a cocked position holding said latch in said cocked position thereof, and a fired position releasing said latch for pivoting said latch to said fired position thereof; and said spring being positioned for providing a returning force on said trigger to return said trigger to said cocked position thereof upon release of said trigger.

10. A method of using the swatter of claim 9 comprising:

cocking said thumbgrip to position said latch into said cocked position thereof;

stretching said lash by pulling said lash second loop generally parallel to said rod and adjacent to said rod proximal end;

latching said lash second loop around said latch;

gripping said handgrip to aim said rod distal end at said insect; and pulling said trigger to release said latch to said fired position thereof to spontaneously contract said lash for swatting said insect.

11. A swatter according to claim 9 wherein:

said lash has an unstretched length;

said rod and latch have a collective cocked length measured between said keyhole slot and said latch in said cocked position thereof; and said cocked length is selected for stretching said lash to about its maximum stretchable length without breaking thereof.

12. A swatter according to claim 11 wherein said cocked length is at least three times said lash unstretched length.

* * * * *